United States Patent

Matsuura et al.

Patent Number: 5,143,667
Date of Patent: Sep. 1, 1992

[54] SKIN COVERED FOAMED PLASTIC SEAT WITH HOLES

[75] Inventors: Ichiro Matsuura; Takashi Sugiura; Fumio Miyauchi; Toyoharu Chiyoshi, all of Ayase, Japan

[73] Assignee: Ikeda Bussan Co., Ltd., Kanagawa, Japan

[21] Appl. No.: 611,325

[22] Filed: Nov. 9, 1990

Related U.S. Application Data

[63] Continuation of Ser. No. 395,034, Aug. 17, 1989, abandoned.

[51] Int. Cl.$^5$ ............................................. B29C 67/22
[52] U.S. Cl. .................... 264/46.6; 264/46.4; 264/46.5
[58] Field of Search ............ 264/46.6, 46.7, 46.4, 264/46.8, 46.5

[56] References Cited

U.S. PATENT DOCUMENTS

| | | | |
|---|---|---|---|
| 3,112,987 | 12/1963 | Griffiths et al. | 264/46.7 |
| 3,381,999 | 8/1966 | Steere, Jr. | 264/129 |
| 4,524,966 | 6/1985 | Shannon et al. | 247/DIG. 2 |
| 4,786,103 | 11/1988 | Selbert | 297/DIG. 1 |

FOREIGN PATENT DOCUMENTS

| | | | |
|---|---|---|---|
| 51-035229 | 10/1976 | Japan | 264/46.6 |
| 58-101027 | 6/1983 | Japan | 264/46.6 |

*Primary Examiner*—Robert A. Dawson
*Assistant Examiner*—Allan R. Kuhns
*Attorney, Agent, or Firm*—Weiser & Stapler

[57] ABSTRACT

A skin covered foamed plastic seat capable of preventing the leakage of the liquid foam resin from the holes to be made on it. The skin covered foamed plastic seat includes a trim cover attached to the skin cover at locations of holes, to cover side faces of the bossings of the molding surface when the skin cover is placed over the molding surface.

3 Claims, 1 Drawing Sheet

SKIN COVERED FOAMED PLASTIC SEAT WITH HOLES

This application is a continuation of application Ser. No. 395,034 filed Aug. 17, 1989, now abandoned.

BACKGROUND OF THE INVENTION

1. Field of the Invention

The present invention relates to a skin covered foamed plastic seat and, more particularly, to such a seat incorporating holes at desired positions, and to a process of manufacturing the seat.

2. Description of the Background Art

Car seat cushions and seat backs have been made of a pad member covered by a skin cover. The pad member and the skin cover used to be manufactured separately and combined together later, but it has become the practice to manufacture a skin covered pad member altogether by making the foamed plastic inside the skin cover placed over a molding surface, so that the process of combining at a later time may be omitted.

One of the most common problems encountered in such a process of manufacturing a skin covered pad member is the leakage of the liquid foam resin which will become a pad member onto the front surface of the skin cover.

In general, the skin cover comprises an air permeable front surface skin and a backing material called wadding which is not air permeable. This wadding may be effective enough to prevent the leakage of the liquid foam resin, but for a skin covered pad member such as that to be used for a rear seat cushion which is required to have holes for inserting the seat belts, the problem of the leakage of the liquid foam resin cannot be prevented by such wadding, so the effective method to prevent such leakage in such a case has not been known conventionally.

Normally, the required holes on the skin covered pad member are manufactured by using a mold with bossings corresponding to the holes to be made, but when the skin cover is placed over the mold, there is usually a small space between these bossings and the edges of the skin cover surrounding the bossings, so that when the liquid foam resin is poured into the mold, the leakage of the liquid foam resin through such a space between the bossings and the edges of the skin cover occurs, and the leaked liquid foam resin will be foamed on the front surface of the skin cover which has to be removed afterwards. This leaked foam resin after the foaming of the liquid foam resin is not easily removable, so that the leakage of the liquid foam resin can severely affect the manufacturing efficiency.

Even when the bossings are made to fit with the edges of the skin cover tightly at the beginning of the manufacturing process, the force due to the expansion of the liquid foam resin in the foaming process which will tend to pull the skin cover away from the bossings can create a space between the bossings and the edges of the skin cover, so that the leakage cannot be prevented.

SUMMARY OF THE INVENTION

It is therefore an object of the present invention to provide a skin covered foamed plastic seat capable of preventing the leakage of the liquid foam resin from a space between the skin cover and the bossings provided on the mold for the holes to be made through the seat, and thereby improving the manufacturing efficiency of such a skin covered foamed plastic seat with holes.

This object is achieved by the present invention by providing a skin covered foamed plastic seat, comprising a skin cover covering a surface of the skin covered foamed plastic seat, having holes corresponding to holes to be made on the skin covered foamed plastic seat; a pad member to be manufactured from liquid foam resin poured onto the skin cover placed over a molding surface, having holes to be made by bossings provided on the molding surface; and a trim cover attached to the skin cover at locations of holes, to cover side faces of the bossings of the molding surface when the skin cover is placed over the molding surface.

Other features and advantages of the present invention will become apparent from the following description taken in conjunction with the accompanying drawings.

DETAILED DESCRIPTION OF THE PREFERRED EMBODIMENTS

Figure 1:
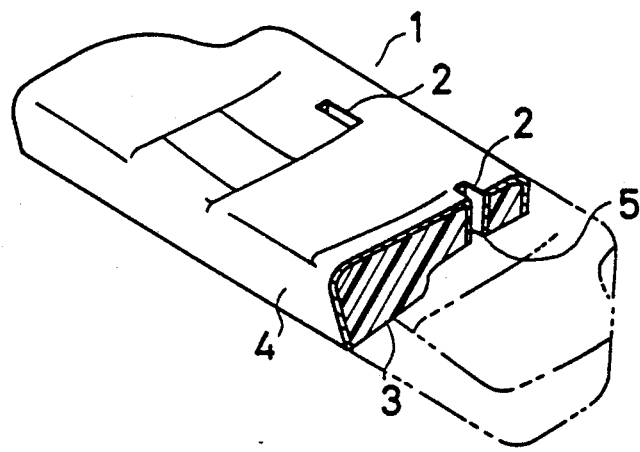
FIG. 1 is a perspective view, cut away to show a cross section of one embodiment of a skin covered foamed plastic seat according to the present invention.

Referring now to FIG. 1, there is shown one embodiment of a skin covered foamed plastic seat according to the present invention.

This seat 1 is to be used for a rear seat cushion for a bench seat type rear seat, with a pair of elongated holes 2 for inserting the seat belts.

The skin covered foamed plastic seat 1 comprises a pad member 3 and a skin cover 4 covering the pad member 3.

In addition, in this embodiment, there is a cylindrical trim cover 5 covering an inner face of each of the holes 2, which is sewed to the skin cover 4.

Figure 2:
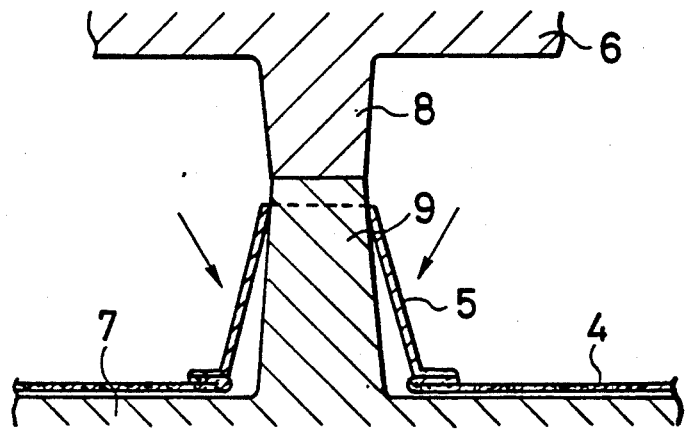
FIG. 2 is a magnified cross sectional view of bossings of one type of a mold to be used in manufacturing the skin covered foamed plastic seat of FIG. 1 with a trim cover to be incorporated in the skin covered foamed plastic seat of FIG. 1.

In manufacturing this seat 1, a mold to be used incorporates bossings at the positions of the holes 2, as in FIG. 2 which shows an upper mold 6 having a bossing 8 engaged with a lower mold 7 having a bossing 9.

The skin cover 4 will be placed over a molding surface of the lower mold 7, with the bossing 9 inserted into the trim cover 5. The trim cover 5 has a lower diameter larger than that of the bossing 9 and an upper diameter approximately equal to that of the bossing 9, for the sake of ease in the insertion of the bossing 9.

The skin covered foamed plastic seat 1 is then made by pouring liquid foam resin into a cavity between the upper mold 6 and the lower mold 7, which will subsequently become the pad member 3 after the foaming process. During the foaming process, the force due to expansion of the liquid foam resin in the foaming process will be applied to the skin cover 4 which presses the skin cover 4 tightly onto the molding surface. This force is also exerted on the trim cover 5 in directions indicated by arrows in FIG. 2, which makes the upper end of the trim cover 5 shrink and the lower end of the trim cover 5 to widen, so that the contact between the bossing 9 and the trim cover 5 will be gradually tightened until eventually, a side face of the trim cover 5 is tightly pressed against the bossing 9.

The trim cover 5 so incorporated covers the holes 2 completely during the manufacturing process outlined above, so that the leakage of the liquid foam resin through the space between the bossing 9 and the edge of the skin cover 4 can be prevented.

Moreover, the trim cover 5 will cover the holes 2 completely in the finished skin covered foamed plastic seat 1, so that direct exposure of the pad member 3 at the holes 2 can be avoided, which furnish the skin covered foamed plastic seat 1 with a neater appearance. In this regard, the use of the same material for the trim cover 5 as the surface skin of the skin cover 4 is preferable, but this of course is not a necessary requirement.

Figure 3:
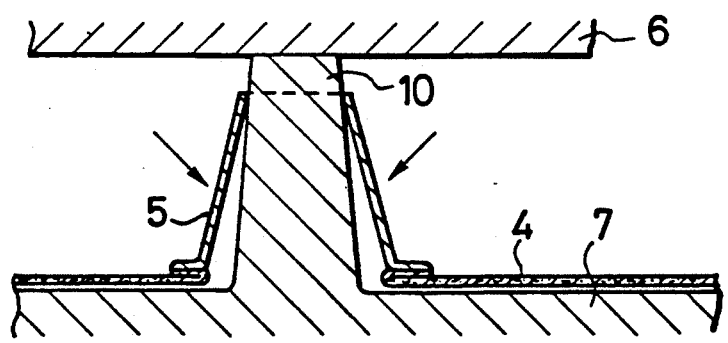
FIG. 3 is a magnified cross sectional view of a bossing of another type of a mold to be used in manufacturing the skin covered foamed plastic seat of FIG. 1 with a trim cover to be incorporated in the skin covered foamed plastic seat of FIG. 1.

The skin covered foamed plastic seat 1 of this embodiment equally functions for another type of a mold such as that shown in FIG. 3 which has a bossing 10 on the lower mold 7 alone. Obviously, the manufacturing process described above for the mold shown in FIG. 2 applies almost verbatim for this mold shown in FIG. 3 except for the reference numeral of the bossing on the lower mold 7, which will therefore not be repeated again.

It is to be noted that many modifications and variations of the above embodiments may be made without departing from the novel and advantageous features of the present invention. Accordingly, all such modifications and variations are intended to be included within the scope of the appended claims.

What is claimed is:

1. A method of manufacturing a skin covered foamed plastic seat with holes therein, the skin covered foamed plastic seat comprising a pad member covered by a skin cover having holes corresponding to holes of the pad member, and the method comprising the steps of:
   providing a skin cover and separate trim covers;
   attaching the separate trim covers to the skin cover at the holes of the skin cover;
   placing the skin cover with the attached trim covers on a molding surface having bossings for forming the holes of the pad member so that the trim covers cover side faces of the bossings; and
   pouring liquid foam resin onto the skin cover placed on the molding surface and allowing the liquid foam resin to stiffen, so that the holes are made in the pad member by the bossings, and so that the trim covers are covering circumferential faces of the holes.

2. The method of claim 1, wherein the trim covers have a first opening with a diameter greater than the diameter of the bossing to which the trim cover is attached, and a second opening with a diameter approximately equal to the diameter of the bossing, and which further comprises the step of placing the trim covers over the bossings so that the first openings overlie the skin cover and so that the second openings engage the bossings.

3. The method of claim 1, wherein the trim covers have a first opening with a diameter greater than the diameter of the bossing along base portions of the bossing where the trim cover is attached to the skin cover, and a second opening with a diameter approximately equal to the diameter of the bossing along top portions of the bossing, and which further comprises the step of inserting the trim covers over the bossings with the first opening leading when the skin cover is placed on the molding surface.

* * * * *